United States Patent
Klassen et al.

(10) Patent No.: US 8,056,617 B2
(45) Date of Patent: *Nov. 15, 2011

(54) HVAC SYSTEM FOR A WORK VEHICLE

(75) Inventors: Mark D. Klassen, Lockport, IL (US); Leonid Chernyavsky, Glenview, IL (US); Alan G. Leupold, Plainfield, IL (US); Paul E. Wibbels, West Fargo, ND (US); Michael C. Bunnell, Clarendon Hills, IL (US); M. Javaid Arshad, Plainfield, IL (US)

(73) Assignee: CNH America LLC, New Holland, PA (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/567,600

(22) Filed: Sep. 25, 2009

(65) Prior Publication Data

US 2010/0048118 A1    Feb. 25, 2010

Related U.S. Application Data

(62) Division of application No. 11/006,147, filed on Dec. 7, 2004, now Pat. No. 7,681,630.

(51) Int. Cl.
*B60H 1/00* (2006.01)

(52) U.S. Cl. ............ 165/202; 165/42; 165/43; 165/234; 165/244; 165/247; 165/248; 454/70; 454/75; 454/158

(58) Field of Classification Search .............. 165/202, 165/42, 43, 234, 244, 247, 248; 454/70, 454/75, 158

See application file for complete search history.

(56) References Cited

U.S. PATENT DOCUMENTS

| | | | |
|---|---|---|---|
| 3,505,828 A | 4/1970 | Vander Molen et al. | |
| 3,983,930 A | 10/1976 | Franz | |
| 4,143,706 A | 3/1979 | Schnaibel et al. | |
| 4,357,988 A * | 11/1982 | Hudson et al. | 165/202 |
| 4,467,706 A * | 8/1984 | Batcheller et al. | 454/70 |
| 4,730,662 A * | 3/1988 | Kobayashi | 165/204 |
| 5,216,892 A | 6/1993 | Jarosch et al. | |
| 5,275,012 A | 1/1994 | Dage et al. | |
| 5,316,074 A * | 5/1994 | Isaji et al. | 165/43 |
| 5,335,514 A | 8/1994 | Hennessee et al. | |
| 5,617,730 A | 4/1997 | Suzuki | |
| 5,743,099 A | 4/1998 | Kraynak et al. | |
| 5,813,600 A | 9/1998 | Straub | |

(Continued)

FOREIGN PATENT DOCUMENTS

EP    169040 A2 *    1/1986

(Continued)

*Primary Examiner* — John Ford

(74) *Attorney, Agent, or Firm* — Patrick M. Sheldrake; Michael G. Harms

(57) ABSTRACT

An HVAC system for work vehicle having an operator compartment for an operator is disclosed. The HVAC system includes a pressurizer blower and an air-conditioning system coupled to an electronic circuit. The electronic circuit is configured to reduce the output of the pressurizer blower when the operator selects a high output from the air-conditioning system. The HVAC system is also configured to provide defog operation in both a manual mode and an automatic mode of operation. The HVAC system is configured to reset the defog operation when the vehicle ignition is turned off or turned back on. The HVAC system is also configured not to reset the defog operation when the operator switches rapidly between the automatic mode and the manual mode of operation.

6 Claims, 3 Drawing Sheets

U.S. PATENT DOCUMENTS

| | | |
|---|---|---|
| 5,950,440 A | 9/1999 | Niimi et al. |
| 6,254,011 B1 | 7/2001 | Kelley et al. |
| 6,385,982 B1 * | 5/2002 | Ota et al. ............ 62/209 |
| 6,398,294 B1 | 6/2002 | Bollweg et al. |
| 6,427,465 B1 | 8/2002 | Bednarchik et al. |
| 6,640,890 B1 | 11/2003 | Dage et al. |
| 6,672,085 B1 | 1/2004 | Sangwan et al. |
| 7,681,630 B2 * | 3/2010 | Klassen et al. ............ 165/202 |
| 2004/0031601 A1 | 2/2004 | Dage et al. |

FOREIGN PATENT DOCUMENTS

| | | | |
|---|---|---|---|
| EP | 1669225 A1 * | 6/2006 | |

* cited by examiner

HVAC SYSTEM FOR A WORK VEHICLE

This divisional application claims priority under 35 U.S.C. §120 from U.S. patent application Ser. No. 11/006,147 filed on Dec. 7, 2004 now U.S. Pat. No. 7,681,630 by Mark Klassen et al. with the same title, the full disclosure of which is hereby incorporated by reference.

FIELD OF THE INVENTION

The present invention generally relates to work vehicles. More particularly, it relates to HVAC systems for work vehicles. Even more particularly, it relates to the control strategies and modes of operation for such HVAC systems.

BACKGROUND OF THE INVENTION

Operator compartments for modern work vehicles are often enclosed with large glass or plastic panels that extend substantially the entire way around the operator. The large panels enclose the operator and protect the operator from the elements. The panels define operator compartments that are significantly larger than the compartments of automobiles.

This large internal volume and expanse of transparent panels makes the operator compartment (or "cabin") function like a greenhouse. When a work vehicle is turned off and left in bright sunlight, even for a short time, the compartment can heat to over 50 degrees C. This solar heating is compounded by engine and transmission heat, which can be substantial as well.

The first thing most operators do on entering a work vehicle on a hot summer's day is to turn the air conditioner on full blast until the operator compartment temperature is bearable. Given the size of the operator compartment and heat loading from the sun, this can take a while.

Work vehicles may have a pressurizer blower, which can make them even more difficult to cool. Vehicles such as tractors or combines have two blowers, one blower for pressurizing the operator compartment with outside air and the other blower for recirculating air within the operator compartment.

The purpose of the pressurizer blower is to provide a slight positive pressure in the operator compartment. This ensures that no air is sucked into the operator compartment through cracks are gaps in the ceiling, walls, or floor of the operator compartment. This positive pressure is about 6 to 25 mm of water, which is enough to prevent dirty, dusty air from infiltrating into the compartment, dirtying seats and possibly fouling operator controls.

Since an older vehicle may have many small air leaks located around the compartment, a pressurizer blower may blow a significant amount of hot outside air into the operator compartment to maintain a slight positive pressure inside the compartment.

Therefore, when the operator mounts the vehicle and turns the air conditioner on, he is not only cooling down the heated interior of the operator compartment, he is also cooling down all the hot air introduced by the pressurizer blower. This delays the initial cool-down of the vehicle.

Reviewing this problem, the applicants discovered that even with the pressurizer blower disabled, a slight positive pressure can be maintained in the operator compartment by running the cabin recirculation blower at its maximum speed. At this speed, the recirculation blower draws sufficient amount of fresh air into the cab to provide minimum cab pressurization of 6 mm of water needed to protect the cab from dust ingress. Thus, it was possible to turn the pressurizer blower off, thereby reducing the amount of hot air drawn into the operator compartment during initial cool-down of the operator compartment or during extreme conditions when the vehicle is exposed to high heat loads.

What is needed, therefore, is an HVAC system for work vehicle that prevents the pressurizer blower from blowing hot air into the operator compartment during initial cool-down or extreme conditions. What is also needed is a system for reducing the output of the pressurizer blower when the operator selects high output from the air-conditioning system. What is further needed is an HVAC system that automatically senses when the operator wants high output from the vehicle air-conditioning system and automatically reduces the output of the pressurizer blower. These and other objects are satisfied by the invention described below.

SUMMARY OF THE INVENTION

In accordance with a first aspect of the invention, an HVAC system for work vehicle is provided, the vehicle having an operator compartment for a vehicle operator, the system including an air-conditioning system; an operator compartment pressurizer blower; and an electronic circuit coupled to both the air-conditioning system and the pressurizer blower, wherein the circuit is configured to reduce pressurizer blower output when the operator selects high output from the air-conditioning system.

The electronic circuit may be an electronic control unit including a microprocessor. The system may further include a manually operable temperature control for selecting among a plurality of air temperatures, wherein the control is coupled to the electronic circuit. The high output may be selectable by manual operation of the temperature control. The system may further include a recirculation blower disposed to draw air from the operator compartment, draw air through evaporator coils, and expel air back into the operator compartment. The electronic circuit may be configured to reduce pressurizer blower output when the operator both selects high output from the air-conditioning system and selects high output from the recirculation blower.

In accordance with a second aspect of the invention, an HVAC system for a work vehicle having an operator compartment for an operator is provided, the system including means for cooling air in the operator compartment; means for pressurizing air in the operator compartment; and means coupled to both the means for cooling air and the means for pressurizing air for reducing output from the means for pressurizing air when the operator selects high output from the means for cooling air.

The means for reducing output may include a microprocessor. The system may further include temperature control means for selecting among a plurality of air temperatures, wherein the means for selecting is coupled to the means for reducing. The high output may be selectable by manual operation of the temperature control means. The system may further include means for recirculating air through the operator compartment. The means for reducing output may be configured to reduce output of the means for pressurizing air when the operator both selects high output from the means for cooling air and selects high output from the means for recirculating air.

In accordance with a third aspect of the invention, a method for controlling excess heat in an operator compartment of a work vehicle is provided, the work vehicle having an air-conditioning system and a pressurizer blower, the method including the steps of selecting a high output from the air-conditioning system; and automatically reducing the output of the pressurizer blower.

The method may further include the step of selecting a high output from a recirculation blower. The step of selecting a high output from the air-conditioning system may include the step of manipulating the temperature control to select its lowest possible temperature setting. The recirculation blower may be configured to draw air from the operator compartment, through an evaporator of the air-conditioning system and back into the operator compartment.

In accordance with a fourth aspect of the invention, an HVAC system for conditioning air in a work vehicle having an operator compartment for a vehicle operator is provided, the system including an air-conditioning system; a heating system; an operator compartment recirculation blower; an electronic circuit coupled to the air-conditioning system, the heating system, and the recirculation blower; and an operator console having a defog switch and the temperature control coupled to the electronic circuit; wherein the electronic circuit is configured to provide defog operation to defog or dehumidify the air in both a "manual" mode of operation and an "automatic" mode of operation.

The system may further include a mode switch coupled to the electronic circuit and configured to select between the "automatic" mode of operation and the manual mode of operation. The electronic circuit may be configured to reset the defog operation when the work vehicle ignition is turned off. The electronic circuit may be configured to maintain the defog operation in effect when the operator switches rapidly between the "automatic" mode of operation and the manual mode of operation.

Numerous other features and advantages of the present invention will become readily apparent from the following detailed description, the accompanying drawings, and the appended claims.

DETAILED DESCRIPTION OF THE PREFERRED EMBODIMENTS

Figure 1:
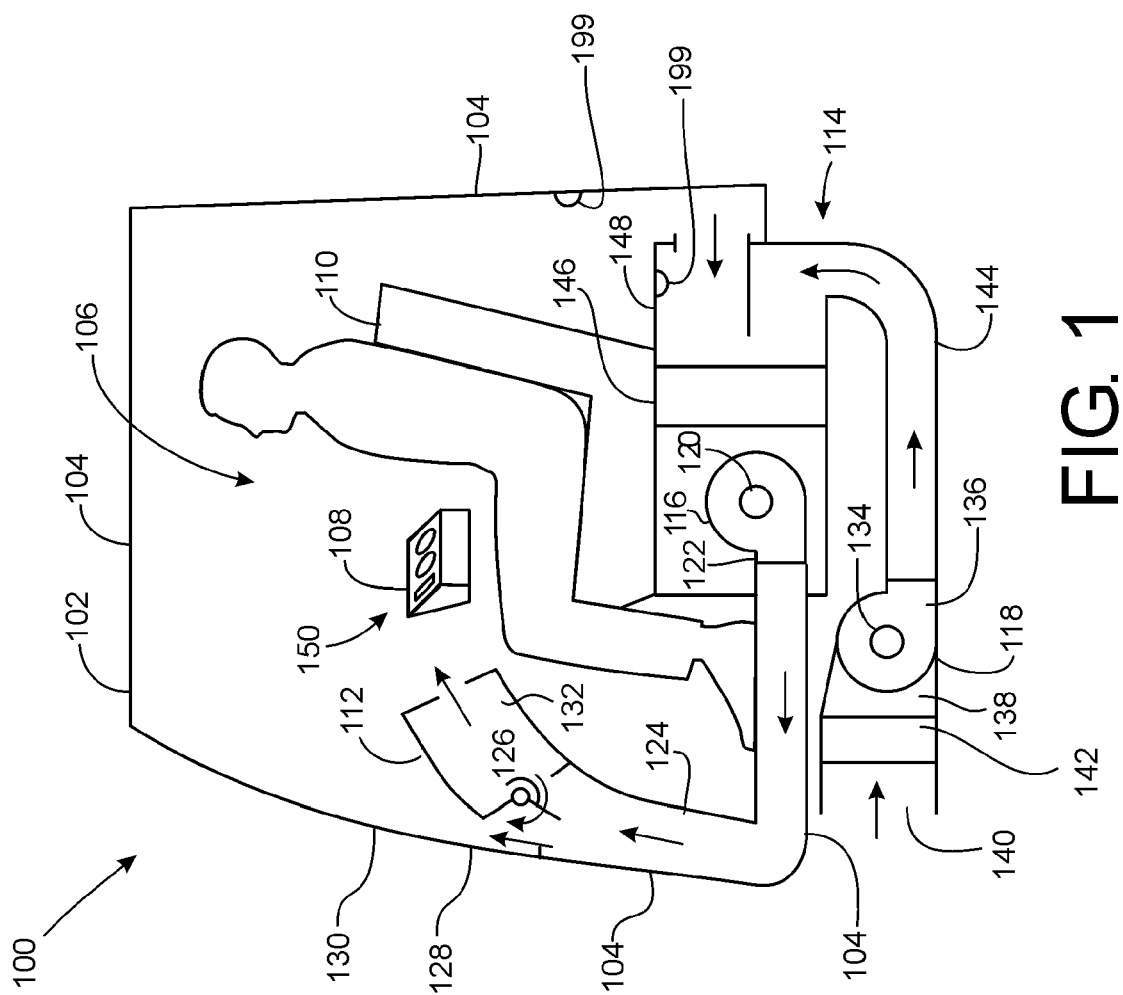
FIG. 1 is a schematic left side view of the cabin of a work vehicle in accordance with the present invention.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Referring now to the FIGURES, there is illustrated a work vehicle 100 including an operator compartment 102 having walls 104 that enclose an operator station 106. Operator station 106 includes operating console 108, seat 110, and dashboard (or front console) 112. Ventilating air conduits 114 are in fluid communication with the bottom of operator compartment 102 to conduct outside air into the upper compartment 102 and to recirculate air within operator compartment 102.

Air is driven through conduits 114 by a recirculation blower 116 and a pressurizer blower 118. Recirculation blower 116 has an inlet 120 that is disposed inside operator compartment 102 to receive air from inside the operator compartment. Recirculation blower 116 receives this air at its inlet 120, pressurizes it, and transmits it to its outlet 122. From outlet 122, blower 116 blows the air through conduit 124. The air travels through conduit 124 along the floor of the operator compartment up the front wall, and is directed by a mode door 126 into one of two paths. The first path 128 directs the air upward along the front windshield 130 of the operator compartment 102. The second path 132 directs the air through the dashboard 112 and toward the operator's face.

Pressurizer blower 118 has an inlet 134 and an outlet 136. Pressurizer blower 118 is configured to receive air from inlet air conduit 138 which itself has an inlet 140 in fluid communication with the outside atmosphere. Air conduit 138 also has a fresh air filter 142 disposed therein, which filters incoming atmospheric air. The outlet of pressurizer blower 118 is in fluid communication with an outlet conduit 144, which in turn conducts air from the blower into operator compartment 102.

Recirculation blower 116 draws air through heater and evaporator coils 146, which are disposed in inlet air conduit 148 of recirculation blower 116. By controlling the minimum evaporator temperature and/or hot coolant flow rate conducted through heater coils 146, and by controlling the speed of recirculation fan 116 and pressurizer fan 118, the operator in "manual" mode or the system in "auto" mode is able to tailor the temperature of operator compartment 102 to suit the operator. The heater and evaporator coils 146 may be disposed adjacent to each other as shown in FIG. 1. In an alternative embodiment, however, they may be spaced apart. They may also be disposed in different air ducts.

The operator controls the temperature of the compartment by manipulating individual operator controls 150 disposed in operating console 108. These controls are shown in more detail in FIG. 2.

Figure 2:
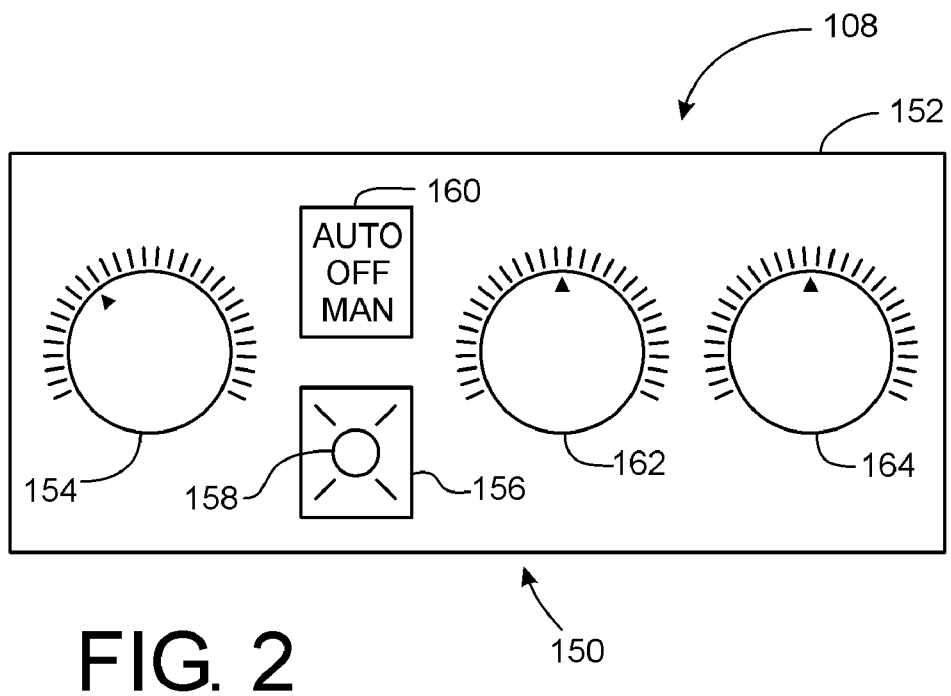
FIG. 2 is a detailed view of an operating console for operating the HVAC system of the work vehicle.

Referring now to FIG. 2, the operating console 108 includes a front panel 152 on which controls 150 are mounted. Controls 150 include a blower speed control 154 that is manually operable to select a plurality of different blower speeds. In the preferred embodiment, the blower speed control 154 is a potentiometer having 30 detented positions permitting the operator to select as many as 30 different fan speeds.

Controls 150 also include a defog switch 156 and a defog indicator light 158. Defog switch 156 is a momentary contact switch, configured to turn defog (also known as "dehumidify") function on or off. The defog indicator light 158 is configured to indicate when the HVAC system has responded to operator manipulation of defog switch 156 and is defogging/dehumidifying the air.

Controls 150 also include an auto/off/manual switch 160 which is a three position detented toggle switch. The three positions correspond to three modes of operation of the HVAC system: "auto", "manual", and a central "off" position through which the switch must travel when switched between "auto" and "manual". The auto/off/manual switch 160 includes suitable visual indicia to indicate to the operator the modes of operation that can be selected by manipulating switch 160.

Controls 150 also include a temperature control 162 that permits the operator to select cabin temperature. Temperature control 162 is preferably a potentiometer having 30 detented positions, thereby permitting the operator to select as many as 30 different relative temperatures or heating/cooling positions. In "manual" mode temperature control 162 has two ranges, a lower or "cooling" range of positions that causes the HVAC system to cool the operator compartment using the air conditioner, and an upper or "heating" range causes the HVAC system to heat the operator compartment using hot water from the engine passing through heating coils in the operator compartment. In "auto" mode, an operator can select 30 different cab set temperatures at which the cab is maintained.

The final control of controls 150 is mode door control 164. Using this control, the operator controls the position of mode door 126 to direct air toward the operator's feet, toward the operator's face, or toward the windshield 130 of the vehicle.

The controls shown in operating console 108 are coupled to a control circuit 165 to control the operation of blowers 116, 118, heater and evaporator coils 146, and mode door 126. Control circuit 165 is shown in detail in FIG. 3.

Figure 3:
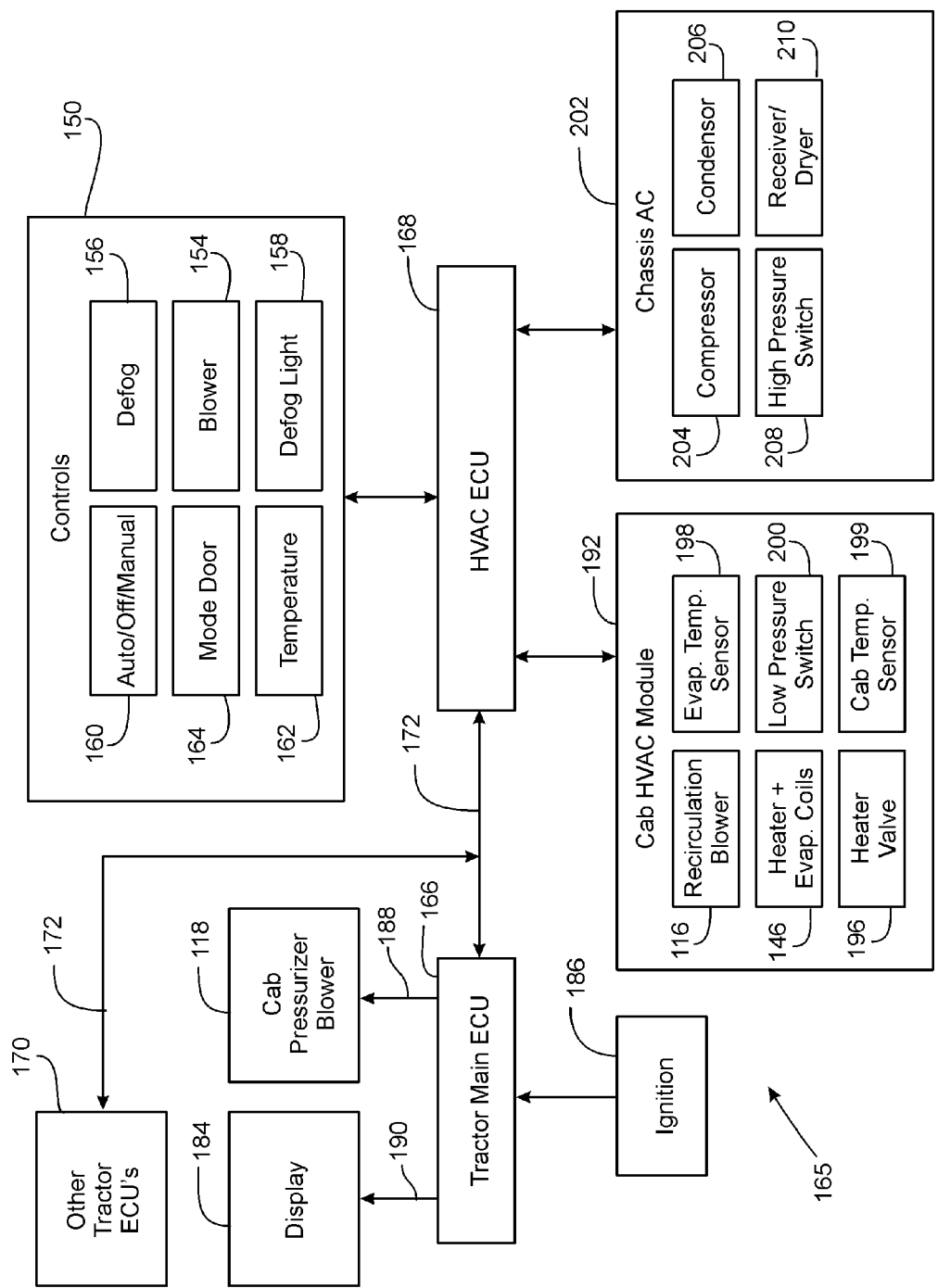
FIG. 3 is a schematic diagram of an electronic circuit for controlling the HVAC system of the work vehicle.

Referring now to FIG. 3, a control circuit 165 includes several microprocessor-based electronic control units (ECU) 166, 168, 170 that are coupled together over a digital communications bus 172. While the preferred embodiment illustrated herein uses three interconnected ECU's, the functions performed by these three ECU's may be distributed between one or more ECU's. Thus, one or more ECU's may be substituted for the three interconnected ECU shown herein.

Figure 4:
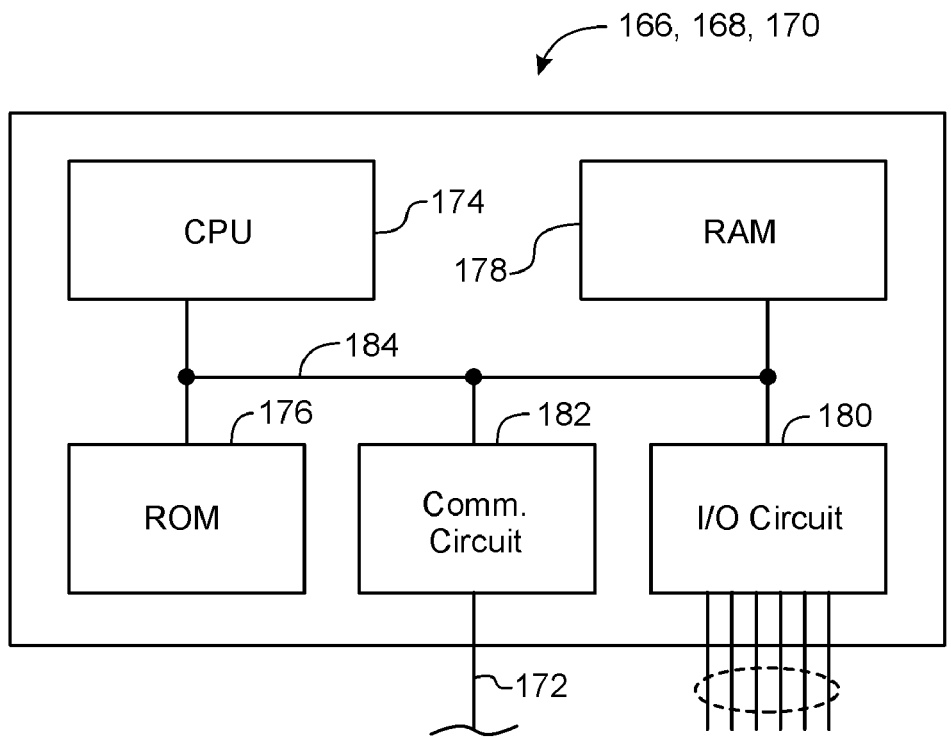
FIG. 4 is a schematic diagram of the electronic control units of electronic circuit of FIG. 3.

FIG. 4 illustrates the internal construction of each ECU 166, 168, 170. As shown in FIG. 4, each ECU has a digital central processing unit (CPU) 174, a read-only memory (ROM) 176, a random access memory (RAM) 178, an input/output (I/O) circuit 180, and a serial communications circuit (SCC) 182. All of these components are coupled together over a control/data/address bus 184.

ROM 176 stores digital instructions that control the operation of the ECU. ROM 176 can be any of the class of non-volatile memory circuits. It may be an EEPROM, flash memory, or flash ROM for example. CPU 174 retrieves these instructions from ROM 176 and executes them. As part of its execution, CPU 174 stores temporary digital working values in RAM 178, thereby providing a workspace for CPU 174. To communicate with other ECUs, CPU 174 transmits a digital data over bus 184 to serial communications circuit 182. Serial communications circuit 182 is configured to transmit this digital data in packetized form over digital communications bus 172. Digital communications bus 172 is preferably a controller area network (CAN) bus operable in accordance with the SAE J1939 standard.

Referring back to FIG. 3, ECUs 166, 168, 170 are coupled together over a bus 172 to transmit status and control information from one ECU to another ECU. Tractor main ECU 166 is coupled to a display 184, to cabin pressurizer blower 118 as well as to an ignition circuit 186. ECU 166 controls the speed of pressurizer blower 118 by transmitting control signals over control lines 188, which are coupled to I/O circuit 180 of ECU 166. ECU 166 selects what is displayed on display 184 by transmitting control signals over control lines 190, which are coupled to I/O circuit 180 of ECU 166. ECU 166 receives control signals from ignition circuit 186. The signals generated by ignition circuit 186 indicate that the operator has turned the vehicle "on" or "off" with the ignition key.

HVAC ECU 168 is primarily responsible for communicating with the heating components, air-conditioning components, and HVAC controls components of the system. ECU 168 is coupled to cabin HVAC module 192, which responsively controls recirculation blower 116, and heater valve 196. HVAC module 192 monitors temperature sensors 198 and coolant low-pressure switch 200, and provides ECU 168 with an indication of their status.

HVAC ECU 168 is also coupled to the chassis air conditioner 202. Air conditioner 202 further includes compressor 204, condenser 206, high-pressure switch 208, and receiver/dryer 210. ECU 168 is configured to turn the compressor on and off in response to cooling system requirements, high and low pressure switch actuation, and evaporator freeze protection as well as monitor high-pressure switch actuation and reset delay time respectively. High-pressure switch 208 is coupled to the condenser and is thrown whenever the condenser pressure exceeds an upper high-pressure limit.

HVAC ECU 168 is coupled to controls 150. ECU 168 is configured to monitor the blower speed control 154 to determine the operator's desired blower speed. ECU 168 is configured to monitor defog switch 156 to determine the operator's desired defog setting. ECU 168 is configured to turn defog indicator light 158 on and off in response to operator manipulation of defog switch 156. ECU 168 is also configured to monitor auto/off/manual switch 160 and change the mode of operation of the HVAC system between "off", "manual", and "automatic" in response to operator manipulation of that switch. ECU 168 is configured to control the air conditioner 202 and the HVAC module 192 to change the temperature of the recirculated air passing through heater and evaporator coils 146 in response to operator manipulation of temperature control 162.

The particular configuration of tractor main ECU 166 and HVAC ECU 168 to provide the various operating modes of the HVAC system is described in further detail below.

Pressurizer Blower Override

When an operator initially enters the cabin of the work vehicle after the work vehicle has been shut down, the cabin may be extremely hot. In this case, the operator typically enters the operator's cab, starts the vehicle, and turns the air-conditioning "on" to request maximum cooling. In the present system, maximum cooling is requested by placing the auto/off/manual switch 160 in the "auto" position, and rotating the temperature control 162 to its extreme counterclockwise position, which indicates maximum cooling. The operator can also request maximum cooling by placing the auto/off/manual switch in "manual" position, rotating the blower speed control 154 all the way clockwise to its maximum recirculation blower speed position, and rotating the temperature control 162 to its extreme counterclockwise position, which indicates maximum cooling. Either of the above described control selections represent a maximum cooling request, to which the system responds by providing the maximum cooling available and by reducing or eliminating the output of the pressurizer blower. This is called a MAX COOLING operation.

In response to the operator's request for maximum cooling by setting the controls to their MAX COOLING settings, HVAC ECU 168 is configured to command HVAC module 192 to turn recirculation blower 116 on to its maximum speed. HVAC ECU 168 is further configured to turn on compressor 204 by electrically signaling the clutch of the air conditioning compressor to engage. In the preferred embodiment, compressor 204 is driven by a belt coupled to the engine of the work vehicle. HVAC ECU 168 is further configured to regulate the temperature of the evaporator at its lowest permissible operating temperature by monitoring evaporator temperature sensor 198. Evaporator temperature sensor 198 is coupled to evaporator coils 146.

To ensure that the operator receives the maximum cooling effect, HVAC ECU 168 is also configured to disable the pressurizer blower 118. The pressurizer blower 118 in the vehicle is intended to maintain a slight positive air pressure inside the operator compartment to ensure that dust and dirt from the outside environment is not drawn into the operator cab and deposited on the various controls and surfaces. The pressurizer blower 118 helps keep the cab clean and the controls operating properly.

The pressurizer blower 118 is configured to maintain a slight ambient air pressure of 6 mm to 25 mm of water within the operator compartment. The larger the gaps that open up, the more airflow it takes from the pressurizer blower 118 to maintain that pressure inside the operator compartment. Since the pressurizer blower 118 draws its air from the outside environment, maintaining this slight operator compartment air pressure can require a substantial flow of hot outside air into the operator compartment.

The hot outside air injected into the operator compartment by pressurizer blower 118 works directly against the efforts of the HVAC system to cool the operator compartment as rapidly as possible. For this reason, HVAC ECU 168 is configured to turn the pressurizer blower 118 "off" when the operator requests MAX COOLING. ECU 168 does this by transmitting a blower command in a packet of digital data over CAN bus 172 to tractor main ECU 166. Tractor main ECU 166 is configured to signal pressurizer blower 118 over control lines 188, commanding it to turn off. With pressurizer blower 118 turned off, the air flow rate forced into the operator compartment is minimized 102 to improve cab cooling. Since in maximum cooling setting the recirculation blower is commanded to operate at maximum speed, sufficient amount of fresh air enters the cab to provide minimum cab pressurization of 6 mm of water, which provides protection from dust ingress into the cab.

Typically, after this initial rapid cooling of the operator compartment, the temperature will reach a point at which the operator is more comfortable. The operator's common reaction to this is to turn temperature control 162 up to a higher temperature, i.e. warmer, setting. The operator does this by rotating the temperature control 162 in a clockwise direction. HVAC ECU 168 senses this change in temperature control from its lowest (or near lowest) setting or position and turns the pressurizer blower 118 back "on" again by transmitting a blower command in a packet of digital data over CAN bus 172 to tractor main ECU 166. Tractor main ECU 166, in turn, is configured to signal pressurizer blower 118 over control lines 188, commanding it to turn on.

In the preferred embodiment, HVAC ECU 168 periodically monitors the voltage provided by temperature control 162 and only turns the pressurizer blower off when the temperature control is turned to its ultimate minimum position. In an alternative embodiment, several of the lowest positions of the temperature control 162 can be used by HVAC ECU 168 to disable pressurizer blower 118. Furthermore, if the recirculation fan blower control is adjusted such that the recirculation blower speed is less than maximum, the pressurizer blower is commanded to be turned on to assure adequate cab pressurization. For example, HVAC ECU 168 can be configured to respond to temperature control 162 being moved to the lowest 5%, 10%, or 20% of the range by disabling the pressurizer blower. In addition, if the auto/off/manual switch is cycled rapidly from "auto" to "off" mode while the recirculation blower speed was other than maximum, the default maximum cooling operation is regained in which pressurizer blower is disengaged and recirculation blower speed returns to maximum.

In yet another alternative embodiment, ECU 168 will only turn the pressurizer blower off when the temperature control 162 is in the lowest (i.e. coolest) portion of its range and the blower speed control 154 is rotated clockwise to its maximum blower speed position. In this embodiment, ECU 168 periodically monitors the position of blower speed control 154 as well as temperature control 162. Whenever temperature control 162 is moved away from the lowest portion of its range or blower speed control 154 is set to less than maximum fan speed, HVAC ECU 168 turns the pressurizer fan 118 back "on" again in the manner described above.

There is one exception to the operation of the pressurizer fan when the operator selects MAX COOLING. When the operator has placed the controls in the MAX COOLING settings, the system will still permit pressure pressurizer blower to operate (i.e. will prevent the disabling of the pressurizer blower) if the operator selects defogging by pressing the defog switch 156. A supply of fresh air provided by the pressurizer blower is necessary for proper defogging and air dehumidification. Hence, even when the operator requests maximum cooling, and outside supply of fresh air must be provided, and thus the pressurizer blower must run.

In the event the operator selects the defog mode of operation while the pressurizer blower is disabled in the MAX_COOLING mode, ECU 168 immediately enables the pressurizer blower.

Manual Mode

The system has a true "manual" mode of operation in which the position of the temperature control 162 is directly proportional to (1) the evaporator core temperature (indicated by sensor 198) when temperature control 162 is in its lower or "cooling" range of positions, and (2) water flowing to the heater valve when the temperature control 162 is in its upper or "heating" range of positions. The system differs from other HVAC systems that have both "automatic" and "manual" modes of operation. In those systems, when the operator selects the "manual" mode, the control circuitry uses a temperature sensor in the cab to control a position of the heater valve (when a heating range of temperatures is selected by a temperature control) or the evaporator core temperature (when a cooling or air-conditioning range of temperatures is selected by a temperature control).

In the present system, to select the "manual" mode of operation, the operator first toggles auto/off/manual switch 160 to the "manual" position. HVAC ECU 168 senses the change in mode switch position, since it is programmed in all modes of operation to periodically scan or read the settings of controls 150. In the "manual" mode, HVAC ECU 168 monitors temperature control 162 to determine the amount of heating or cooling the operator wishes to maintain in the vehicle. If the temperature control 162 is in the lower or "cooling" portion of its range, ECU 168 monitors evaporator temperature sensor 198, which is disposed adjacent to the evaporator coils 146.

As the evaporator coils change temperature, ECU 168 senses the changed temperature and turns the air-conditioning compressor 204 on and off accordingly. If the evaporator coils fall below the temperature selected by the operator with the temperature control 162 set by the operator, ECU 168 turns off compressor 204 by disconnecting or disengaging the compressor clutch. When the compressor is turned off, air conditioner 202 stops cooling. Eventually, the evaporator temperature will increase. This increased temperature is sensed by evaporator temperature sensor 198, which is monitored by ECU 168. Once ECU 168 senses that the temperature has risen above the temperature selected by the operator with the temperature control 162, it turns compressor 204 on again by engaging the compressor clutch.

In the "manual" mode, ECU 168 does not control the temperature of the operator compartment directly. Instead, it controls the temperature of the evaporator coils through which recirculation blower 116 blows the air in the operator compartment. The temperature at which ECU 168 controls the coils in the "manual" mode is proportional to the position of temperature control 162. As the operator moves temperature control 162 in the "manual" mode, ECU 168 selects a new temperature corresponding to the new position of the temperature control, continually engaging and disengaging compressor 204 in the manner described above to control the evaporator coil temperature at that new temperature.

Automatic Mode

The "automatic" mode of operation is called "automatic" because it regulates the temperature of the air in the operator compartment based on the temperature of the air in the operator compartment. Cabin temperature sensor 199 is disposed in the operator compartment at a place where the air temperature is most representative of the temperature in the compartment overall. In FIG. 1, for example, sensor 199 is disposed in the operator compartment away from the outlets that blow air into the compartment in a region where the air is thoroughly mixed. There are two alternative locations for sensor 199, both illustrated, that are shown in FIG. 1. One location is in the operator compartment adjacent to the operator. The other location 199 is disposed inside the inlet air conduit 148. These alternative locations are preferred because their temperatures are representative of the overall or general temperature in the operator compartment itself.

In the "automatic" mode of operation, ECU 168 is configured to control the temperature of the air in the operator compartment or cabin directly. ECU 168 does this by subtracting the commanded temperature (indicated by temperature control 162) from the actual temperature (indicated by cabin temperature sensor 199) and using this difference in temperatures as an input into a lookup table. The lookup table is stored in the nonvolatile memory (e.g. ROM) of HVAC ECU 168. At periodic intervals, ECU 168 is configured to calculate the difference between the commanded temperature and the actual temperature and look up the new compressor command in the lookup table. The compressor command is as simple on/off signal that indicates whether ECU 168 should disengage the air-conditioner compressor clutch or engage the air-conditioner compressor clutch.

In another preferred embodiment, ECU 168 is configured to control the temperature by subtracting the commanded temperature (control 162) from the actual temperature (sensor 199) and using that difference as an error signal in a feedback control loop such as a PID control loop. In this embodiment, the nonvolatile memory (e.g. ROM) of HVAC ECU 168 stores the loop parameters and the calculations to be performed in the control loop as a set of digital instructions that are periodically executed.

ECU 168 operates in a similar manner when heating the operator compartment in the "manual" mode. When the operator demands heating in the operator compartment, he does it by rotating temperature control 162 clockwise into the upper portion of its range.

ECU 168 does not use the air conditioner to temper the air when the operator selects a heating position of temperature control 162. Instead, ECU 168 turns the air conditioner compressor "off" (i.e. disengages the compressor clutch, if it was already on) and opens heater valve 196 proportional to the position of temperature control 162 in the heating range of positions.

ECU 168 heats the air by commanding cab HVAC module 192 to open heater valve 196 to permit a flow rate of hot coolant through heater coils 146 that is proportional to the position of temperature control 162. HVAC ECU 168 is configured to periodically monitor the position of temperature control 162 to detect any change in position. Should the operator move temperature control 162, ECU 168 is configured to responsively and automatically open heater valve 196 proportional to the new position of temperature control 162.

In the "manual" mode of operation, ECU 168 is configured to control the blower at a speed proportional to the position of the blower speed control 154. ECU 168 periodically monitors the position of the blower speed control 154, calculates the proportional speed, and signals cab HVAC module 192 to drive recirculation blower 116 to that speed. When the operator turns the blower speed control to its lowest speed position—the farthest counterclockwise position—ECU 168 is configured to command cab HVAC module 192 to turn off recirculation blower 116. ECU 168 is also configured to command the chassis air conditioner 202 to turn compressor 204 off by disengaging the clutch of compressor 204.

In the "automatic" mode of operation, the HVAC system automatically controls heating, cooling, speed of the recirculation blower 116, and mode door position. It does this automatically based upon the desired cab temperature the operator selects by manipulating temperature control 162. The mode is called "automatic" because it controls the operator compartment temperature directly using the cab temperature sensor 199.

To select the "automatic" mode, the operator manipulates the auto/off/manual switch 160 placing it in its "auto" position. In the automatic mode, HVAC ECU 168 periodically reads controls 150 to determine what mode and temperature the operator has selected. ECU 168 periodically reads cabin temperature sensor 199 to determine the temperature in the operator compartment. The sensor that it reads is disposed within the operator compartment in a position that gives the best measure of the average temperature in the operator compartment. This location will vary, of course, based upon the particular configuration of the operator compartment. The cab temperature sensor 199 may be in a return air duct in the operator compartment, such as inlet conduit 148 (See FIG. 1).

This method of measuring temperature is unlike the method of measuring temperature in the "manual" mode of operation. In the "manual" mode of operation, the temperature that ECU 168 monitors is the temperature in the evaporator coils. This temperature does not reflect the temperature of the air in the operator compartment but the temperature of the coils through which the air flows.

ECU 168 automatically reduces the speed of recirculation blower 116 as the operator compartment temperature (indicated by cabin temperature sensor 199) approaches the temperature indicated by temperature control 162. ECU 168 calculates this difference in temperature as the operator compartment temperature approaches the commanded temperature and either calculates the proper reduced blower speed or looks up the proper reduced blower speed in a lookup table. Once it has determined the proper blower speed for the specific temperature error it calculated, ECU 168 signals Cab HVAC module 192 to adjust the speed of recirculation blower 116. In this manner, by the time the temperature of the air in the operator compartment or cabin has reached the commanded temperature, the blower is running at a very low speed.

Dehumidifying Operation

The HVAC system permits the operator to defog the windows and dehumidify the operator compartment air (called "defog operation" herein) in both the "manual" and the "automatic" modes of operation.

In the "manual" mode of operation (i.e. when the auto/off/manual switch 160 is set to "manual") the operator selects defog operation by momentarily pressing defog switch 156. ECU 168 is configured to periodically monitor the status of controls 150, which includes defog switch 156. When the operator depresses defog switch 156, ECU 168 energizes defog light 158. This visual indicum informs the operator that ECU 168 recognized the operator's command and is providing the defog operation.

Once the operator selects defog operation, ECU 168 enables operation of compressor 204. The difference between defog operation and air-conditioning operation of the compressor is that the compressor 204 runs continuously as long as defog operation is selected and is only turned off when ECU 168 senses that the evaporator coils have reached their freeze temperature.

When ECU 168 (by monitoring temperature sensor 198) determines that the evaporator coils have reached their freeze temperature, it automatically disengages the clutch of compressor 204, thereby turning off the air-conditioning compressor and hence the air-conditioning.

Similarly, when ECU 168 determines that the evaporator coils have risen above their freeze temperature, ECU 168 re-engages the clutch, turning the air-conditioning back on.

While these two temperatures may be the same, they preferably differ by 2-8°, with ECU 168 disengaging the evaporator clutch at a lower temperature than ECU 168 re-engages the evaporator clutch.

Defog operation overrides the default "manual" mode cooling operation that was described above. In "manual" mode cooling operation, described above, ECU 168 controls the actual temperature at the evaporator coils indicated by temperature sensors 198 to be the same as the temperature indicated by temperature control 162. When defog operation is enabled by pressing defog switch 156, ECU 168 maintains the evaporator coils at their freeze limit. Thus, moving temperature control 162 to any position in its cooling range of positions has no effect on the temperature. Temperature control 162 only affects the temperature once control 162 is moved upward into the upper or "heating" range of control 162 positions. In these "heating" positions, ECU 168 does not disengage compressor 204 and open heater valve 196. Instead, ECU 168 keeps controlling the evaporator temperature slightly above its freeze point, but also opens heater valve 196 proportional to the degree of deflection of temperature control 162 in its upper or "heating" range of positions.

In the "automatic" mode of operation, just as in the "manual" mode of operation, ECU 168 similarly engages compressor 204 and maintains the evaporator coil temperature slightly above its freezing point no matter what position temperature control 162 is in. In the "automatic" mode of operation, however, ECU 168 automatically controls the temperature over the entire range of positions for temperature control 162 by regulating the opening of heater valve 196.

Defog Operation Reset

Vehicle operators have certain expectations how an HVAC system should function. One of those expectations is that certain processes or settings will be reset or canceled when the vehicle is turned off and turned back on again. Another expectation is that some processes or settings will be continued when the vehicle is turned off and will continue in exactly the same state when the vehicle is turned back on again.

In a preferred configuration, there are certain functions that the HVAC system resets or cancels when the ignition 186 is turned off and on or the auto/off/"manual" mode switch 160 is changed. One function that is reset or canceled is the defog operation. When the operator has selected defog operation, and the operator then turns off the vehicle ignition 186, thereby shutting the engine down, ECU 168 is configured to reset or cancel defog operation when the vehicle is restarted. When the operator gets back on the vehicle, turns ignition 186 "on" and again starts up the vehicle engine, ECU 168 reads controls 150 and returns the HVAC system to its previous state. It does not, however, re-engage or re-start the defog operation. In this configuration, ECU 168 always starts the vehicle up without turning on the defog function In a similar fashion, when the operator turns auto/off/manual switch 160 to its central "off" position, ECU 168 turns off both the heating and the air-conditioning. ECU 168 performs only one function when the operator has selected the "off" mode, and that is rotating or driving the recirculation fan. With switch 160 in the off position, the operator can turn the fan "on" by selecting a fan speed with blower speed control 154.

When ECU 168 periodically monitors the position of controls 150, it eventually senses that the operator has turned the auto/off/manual switch 160 to its "off" position. In response, ECU 168 immediately the turns off air-conditioning, heating, and the recirculation blower, even if blower speed control 154 is not in its "off" position (which is its counterclockwise-most position in the present embodiment). To make recirculation blower 116 actually run in the "off" mode, ECU 168 is configured to start driving the blower 116 in the "off" mode whenever the operator manipulates blower speed control 154 in the "off" mode to select a different and nonzero speed for the blower. As soon as the operator moves blower speed control 154, ECU 168 signals HVAC module 192 to drive recirculation blower 116 to a speed proportional to the degree of deflection or position of blower speed control 154. With auto/off/manual switch 160 in its "off" position, ECU 168 does not engage the clutch of compressor 204 nor does it open heater valve 196, it merely drives recirculation blower 116.

If, before selecting the "off" position of auto/off/manual switch 160, the operator had turned on defog operation, the operator's subsequent selection of the "off" position of switch 160 causes ECU 168 to suspend defog operation. If the operator presses defog switch 156 when auto/off/manual switch 160 is in the "off" position ECU 168 is configured to do nothing in response: switch 156 has no function when switch 160 is "off".

When the operator switches the auto/off/manual switch 160 between its "automatic" and "manual" positions, the operator inevitably passes over and through the "off" position of the switch, since switch 160 is arranged as a three-position toggle switch having a central "off" position. ECU 168 is programmed to suspend defog operation whenever switch 160 is moved to the "off" position. The problem, however, is that an operator who switches between the "automatic" position and the "manual" position passes through the "off" position not because he wishes to select the "off" mode or position, but merely because there is no other way to get between "auto" and "manual". If ECU 168 was configured to cancel defog operation whenever the operator switched between "auto" and "manual" modes of operation, the operator would be required to reset or re-enable defog operation by depressing defog switch 156 each time the operator changed operating modes from "auto" to "manual" and vice versa using switch 156.

To save the operator this additional button press, once the operator selects defog in ether in "automatic" or "manual" mode, ECU 168 is configured (1) to turn off defog operation whenever the auto/off/manual in the "off" position and (2) to automatically restore defog operation when the operator switches from "off" to the "manual" or the "automatic" modes of operation. ECU 168 is configured, however, to turn defog function "off" while the mode switch is in "off" mode. This assumes, of course, that, while the switch was in the "auto" or "manual" positions, the operator had turned the defog operation "on" with the defog switch 156. With this configuration, defog operation is not turned off when the auto/off/manual switches turn to the "off" position, it is merely suspended. When the switch is returned to the "auto" or the "manual" positions defog operation returns to the state it was in just before the switch was turned "off". Defog operation is suspended, not canceled or reset.

In an alternative configuration, ECU 168 cancels or resets defog operation whenever the auto/off/manual switch 160 is placed in the "off" position and does not re-enable or re-engage defog operation when the auto/off/manual switch 160 is returned to either "auto" or "manual". To prevent this from being burdensome to the operator when the operator merely moves the switch from "auto" through "off" to "manual" or vice versa, ECU 168 is programmed to wait for a predetermined time period (preferably about one second) with auto/off/manual switch 160 in the "off" position before ECU 168 cancels or resets defog operation. If the operator merely transitions auto/off/manual switch 160 quickly through the "off" position and does not leave switch 160 in the "off" position for the predetermined time interval, ECU 168 will not reset or cancel defog operation.

It will be appreciated that the present disclosure is intended as an exemplification of the invention, and is not intended to limit the invention to the specific embodiment illustrated. The disclosure is intended to cover by the appended claims all such modifications as fall within the scope of the claims.

We claim:

1. An HVAC system for a work vehicle having an operator compartment for an operator, the system comprising:
   means for cooling air in the operator compartment having an evaporator, and a manually operable temperature control means;
   a means for recirculating air;
   means for pressurizing air in the operator compartment; and
   means coupled to both the means for cooling air and the means for pressurizing air for reducing output from the means for pressurizing air when the operator selects high output from the means for cooling air;
   the temperature control means allowing direct operator adjustment of the temperature of the evaporator, such that the temperature of the evaporator is proportional to an operator selected setting of the temperature control means;
   wherein high output is achieved in a manual mode by selecting operation of the cooling means at the lower of at least two selectable evaporator temperatures settings and the means for recirculating air operating at the higher of at least two operating settings.

2. The HVAC system of claim 1, wherein the means for reducing output includes a microprocessor.

3. The HVAC system of claim 1, the temperature control means includes means for selecting among a plurality of evaporator temperatures in the manual mode and a plurality of air temperatures of an operator compartment in an automatic mode.

4. The HVAC system of claim 3, wherein the high output is selectable by only manual operation of the temperature control means in the automatic mode.

5. The HVAC system of claim 1, wherein the means for pressurizing air in the operator compartment further comprises an external air intake configured to remain open while under high output and provide positive cab pressurization.

6. The HVAC system of claim 1, wherein the means for reducing output is configured to reduce output of the means for pressurizing air when the operator manually selects the lowest operating temperature from the means for cooling air and manually selects the highest speed from the means for recirculating air.

* * * * *